Nov. 24, 1942.  F. C. FISHER  2,303,263
ELECTROMAGNETIC MOTIVE MEANS
Filed Oct. 18, 1939   4 Sheets—Sheet 1

Inventor
FREDERICK C. FISHER
By Edwin Leisohn
Attorney

Nov. 24, 1942.   F. C. FISHER   2,303,263
ELECTROMAGNETIC MOTIVE MEANS
Filed Oct. 18, 1939   4 Sheets—Sheet 2

Inventor
FREDERICK C. FISHER
By Edwin Leirsoh
Attorney

Nov. 24, 1942.  F. C. FISHER  2,303,263
ELECTROMAGNETIC MOTIVE MEANS
Filed Oct. 18, 1939  4 Sheets-Sheet 4

Inventor
FREDERICK C. FISHER
By Edwin Perisoht
Attorney

Patented Nov. 24, 1942

2,303,263

UNITED STATES PATENT OFFICE 2,303,263

ELECTROMAGNETIC MOTIVE MEANS

Frederick C. Fisher, Bellmore, N. Y., assignor to Electronoid Corporation, a corporation of New York Application October 18, 1939, Serial No. 300,018

15 Claims. (Cl. 172—290)

This invention relates to rectilinear electromagnetic motive means which, while useful for other purposes, is adapted primarily for operating the doors of elevators.

Prior to the present invention, it has been proposed to utilize solenoids for operating the doors of elevators as well as for actuating numerous other devices, but the solenoid operated devices of the prior art have not proved satisfactory, for one reason or another. For example, the ordinary solenoid is of no value as a door operator such as that with which the present invention is concerned because of the limited throw of a solenoid. Further it has not been possible heretofore to obtain by electro-magnetic devices of the solenoid type, a smooth and continuous movement of the length necessary for actuating various devices such as elevator doors. These disadvantages and objections of the prior art devices are eliminated by the present invention and in accordance therewith a continuous, smooth thrusting movement is accomplished throughout any desired distance, the power developed being in proportion to the size of the solenoids used. This constitutes one of the objects of the present invention.

In accordance with the present invention, the electro-magnetic motive means comprises a plurality of solenoid windings associated with a plunger having magnetic and non-magnetic sections, the windings of the solenoids being controlled by a switching device whereby only the solenoid windings in which the magnetic section is about to enter is energized, the other solenoid windings being deenergized and the arrangement being such that the solenoid windings are energized in succession and then deenergized when the magnetic sections are centered therein. The solenoid windings are arranged with their cores in alignment, the plunger extending through said cores so that upon energization of the windings relative movement between the plunger and the windings occurs in a direction longitudinally of the plunger.

I have found that a smooth and continuous thrusting movement of any desired length can be obtained when three solenoid windings are arranged in proper spaced relation longitudinally of the plunger, the spacing between adjacent windings being one and two-thirds the axial length of the winding, and the length of the magnetic and non-magnetic sections of the plunger being equal to said axial length of a solenoid winding.

Another object of the invention is to provide means for automatically energizing and deenergizing the solenoid windings in the proper sequence for obtaining the desired thrusting movement.

A further object of the invention is to provide means for automatically checking the movement of the doors in opening and closing.

The above objects of the invention and other objects which might hereinafter appear and the manner in which said objects are achieved will be more fully understood from the following description considered in connection with the accompanying drawings.

Figure 1:
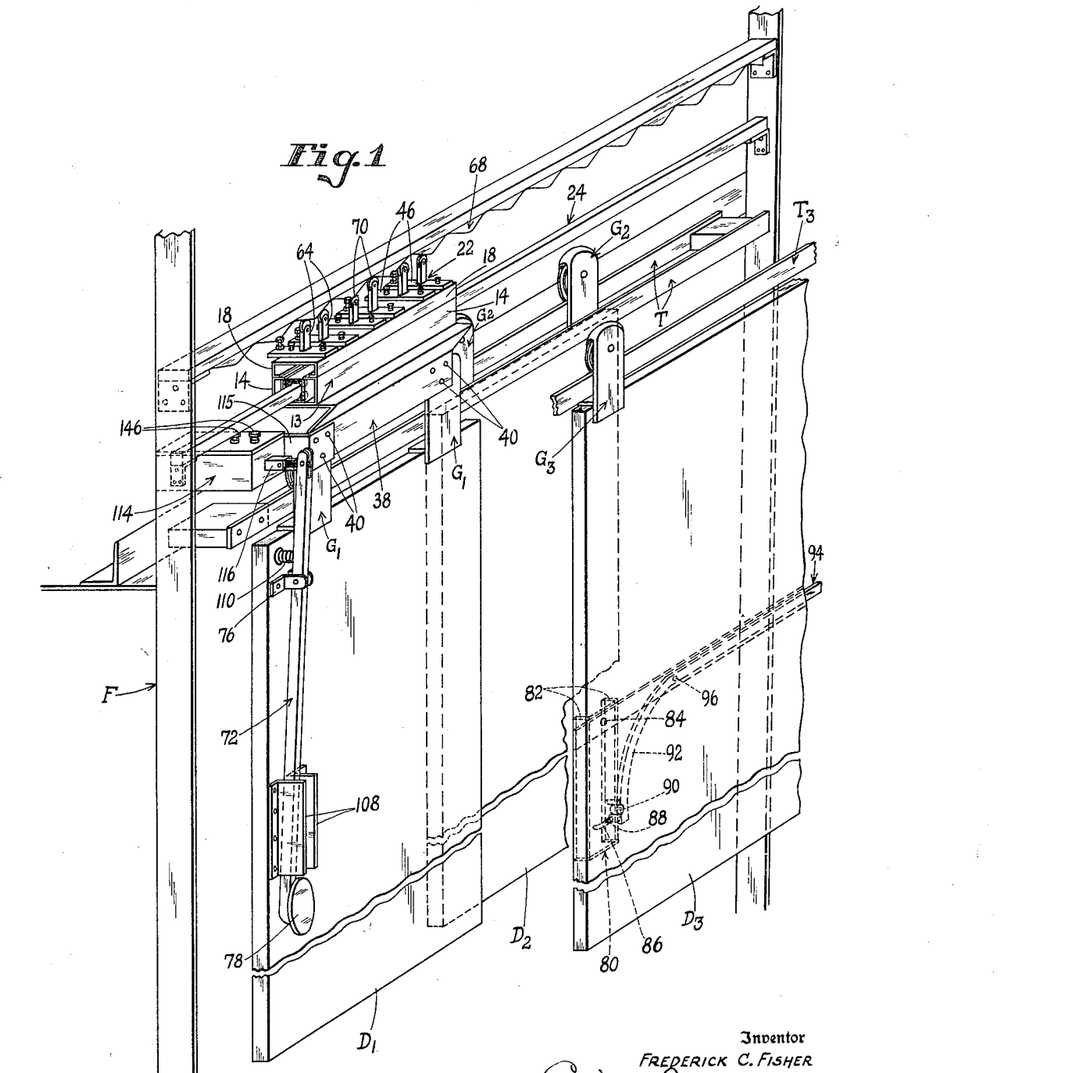
Fig. 1 is a perspective view of the electromagnetic motive means of the present invention associated with the doors of an elevator cab and with a corridor door, the latter being shown displaced from its normal position for illustrative purposes.
Figures 5, 6, 7, 7A:
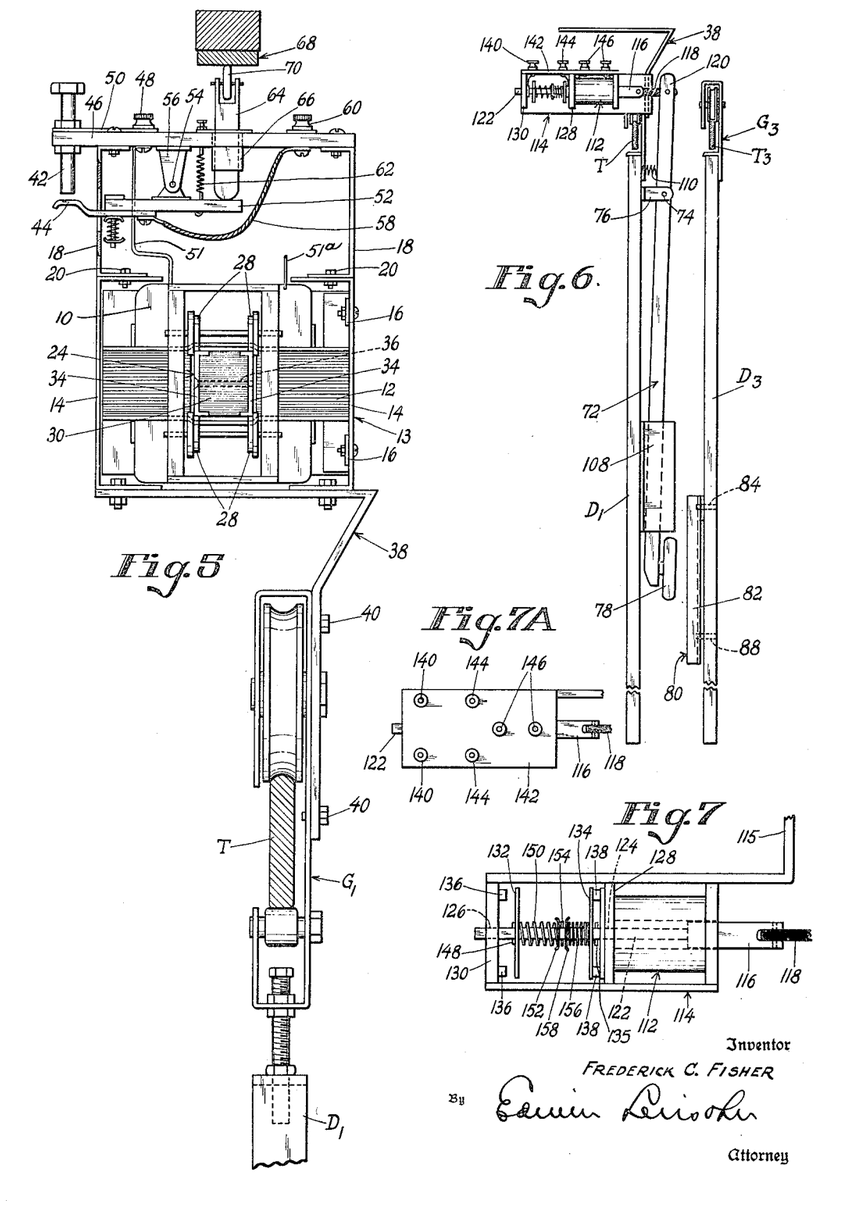
Fig. 5 is an end view, on a larger scale, of the motive device and part of the cab door and mounting.
Fig. 6 is an end view in elevation of the cab door and of the corridor door and of the means for releasably coupling said doors for unitary movement.
Fig. 7 is a top plan view of the solenoid device for actuating the clutching member for coupling the cab door to the corridor door, the top of the solenoid frame being removed.
Fig. 7a shows the top of the solenoid device.

Referring now to the drawings in detail, there is shown in Fig. 1, part of the frame F of an elevator car provided with doors D1 and D2 coupled together for movement in the usual way longitudinally of the fixed tracks T from which they are suspended at their upper ends by means of wheeled brackets G1 and G2, respectively. In Fig. 1, I have also shown a corridor door D3 suspended from and movable longitudinally of a track T3 fixed to the corridor wall. The corridor door D3 is shown displaced from its normal position in relation to the elevator car door D1 for the sake of clearness of illustration and it will be understood that doors D1 and D3 are normally in side by side relation to permit them to be coupled and uncoupled with each other as indicated in Fig. 6.

Figure 2:
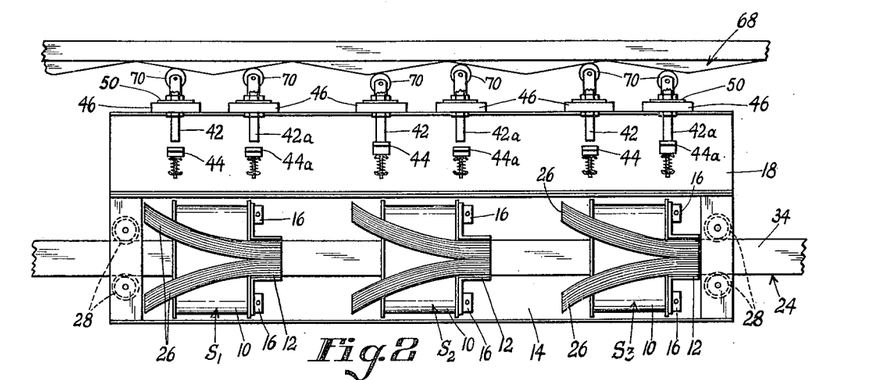
Fig. 2 is a side view, in elevation, of the motive device, parts being omitted for the purpose of illustration.

The elevator car door D1 is opened and closed directly by the electro-magnetic operating device which will now be described. Said device comprises three solenoids, S1, S2 and S3, each having a winding or coil 10 and a laminated iron core 12. Said solenoids are secured in a frame 13 comprising opposed channel irons 14 shown in Figs. 1, 2 and 5, one of said channel irons being omitted from Fig. 2 in order to disclose the solenoids. The cores 12 of the solenoids carry brackets 16 by which they are fixed to the channel irons 14. As hereinbefore stated, said solenoids are arranged in spaced relation, the space between adjacent solenoids being equal to one and two-thirds the axial length of the solenoid winding 10. The frame 13 which comprises the channel irons 14 also includes opposed channel irons 18 secured to channel irons 14 in any suitable way as by bolts 20. Channel irons 18 constitute a mounting for parts of the switching mechanism 22 which will be hereinafter described.

Figures 3, 3A, 4, 8:
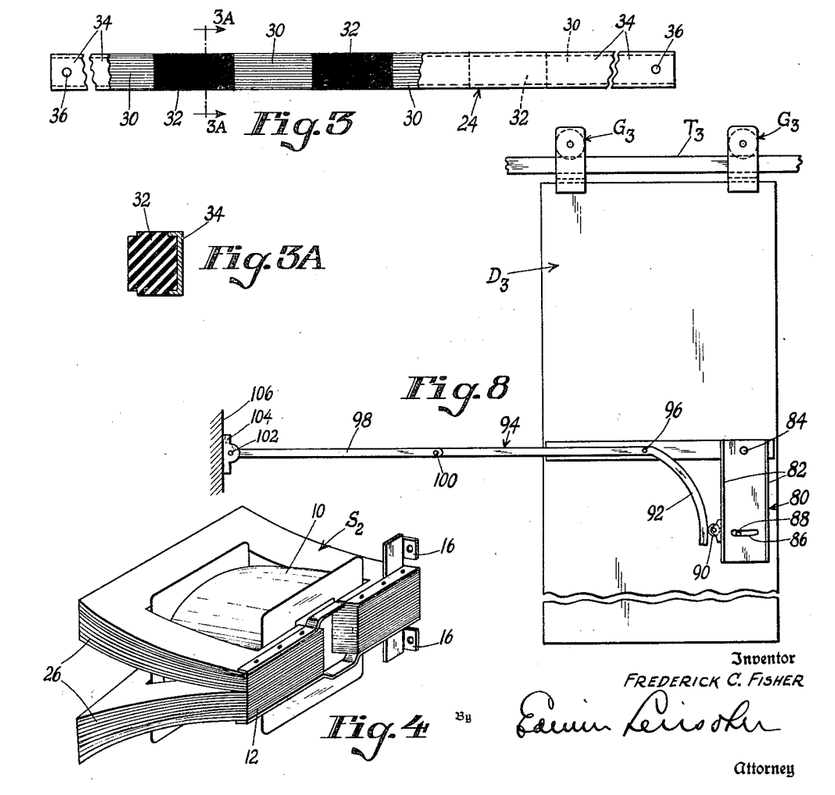
Fig. 3 is a fragmentary side view of the plunger with parts removed for the purpose of illustration.
Fig. 3a is a section on the line 3A—3A of Fig. 3.
Fig. 4 is a perspective view of a solenoid coil and its associated laminated iron core.
Fig. 8 is a cab-side view, in elevation, of the corridor door and of part of the operating mechanism.

The solenoid plunger 24 is secured in fixed position at the top of the elevator car, as illustrated more or less diagrammatically in Fig. 1, and extends through the three solenoids, the latter being movable longitudinally of plunger 24. To permit plunger 24 thus to extend through the solenoids, the cores 12 of the latter are split as clearly illustrated in Figs. 2 and 4, forming divided core portions 26 between which plunger 24 projects. It will be understood that the three solenoids are mounted in alignment so that said solenoids can move longitudinally of the plunger. In order to prevent plunger 24 from sagging and in order to maintain a proper and slight clearance between the solenoid windings and the plunger, the end solenoids S1 and S3 are provided with roller bearings 28 which engage plunger 24 at the upper and lower side marginal edge portions thereof as clearly shown in Figs. 2 and 5. Thus plunger 24 is supported intermediate the ends thereof as well as at its ends.

Plunger 24 comprises magnetic sections 30 and non-magnetic sections 32 (Fig. 3) arranged alternately adjacent each other in abutting end-to-end relation and secured in said relation by a pair of longitudinally extending members 34 of brass or other non-magnetic material. Magnetic sections 30 are laminated, being composed of sheet iron laminae, and non-magnetic sections 32 are composed of fiber or other suitable non-magnetic material. Members 34 are spaced from each other to prevent or reduce eddy current losses. The end sections 30 of the plunger are securely fastened to members 34 in any suitable way as by bolts or screws 36, the ends of which are flush with the outer surfaces of side members 34. Plunger 24 is thus constituted by a solid square rod composed of magnetic and non-magnetic sections in a split brass or other non-magnetic casing. The length of each magnetic and non-magnetic sections 30 and 32 of the plunger is equal to the axial length of the solenoid winding 10. When direct current is used magnetic sections 30 need not be laminated and the casing of the plunger need not be split. Also, with direct current, plunger 24 can have a circular cross section and the solenoid coils can be cylindrical.

With the above described arrangement of the plunger and of the three solenoids, it will be found that when one of the magnetic sections is just entering one of the solenoid windings in either direction, another magnetic section will be almost completely entered in the winding of a second solenoid, while another magnetic section will be leaving the winding of a third solenoid.

Accordingly, by energizing the solenoid windings in such a manner that only the winding in which the magnetic section of the plunger is beginning to enter is energized and automatically de-energized when said plunger section is fully entered, and at the same time relaying the power to the next solenoid winding, a continuous thrusting movement of the frame to which said solenoids are secured will result. With the proper timing of the switching mechanism so as to cause one solenoid winding to be energized an instant immediately before the previous one has been deenergized, and to deenergize each winding the instant its magnetic plunger section has been completely entered, a perfectly smooth operation is obtainable. This smooth movement is transmitted to the elevator car door D1 by connecting the solenoid carrying frame 13 to the elevator door. This is accomplished as here shown by mounting frame 13 on a bracket 38 in fixed relation thereto, said bracket 38 being securely fixed to brackets G1 of door D1 in any suitable way as by bolts 40.

The switching mechanism for energizing and deenergizing the solenoid windings whereby to obtain the above mentioned smooth and continuous thrusting movement will now be described. Said switching mechanism comprises companion pairs of stationary and movable contact members 42, 44 and 42a, 44a, respectively, for each solenoid winding. Companion contacts 42 and 44 are spaced from companion contacts 42a and 44a of each solenoid winding in a direction longitudinally of plunger 24, contacts 42 and 44 controlling the energization and deenergization of the windings in the opening movement of the doors, and contacts 42a and 44a controlling the energization of the windings in the closing movement of the doors. The two pairs of contacts 42, 44 and 42a, 44a, respectively, are in parallel relation and in series with the companion solenoid winding. The stationary contact members 42 and 42a are secured in bars 46 of insulation material and are each connected to a terminal 48 by a conductor strap 50 (Fig. 5). One side of the solenoid winding 10 is connected to terminal 48 by a wire 51. The other side of the solenoid winding is connected by a wire 51a to circuit control means hereinafter described. The movable contact members 44 and 44a are each carried on a bar 52 of insulation material pivotally mounted as at 54 to a bracket 56 which depends from a companion insulation bar 46. Each movable contact member 44 and 44a is electrically connected as by a pigtail 58, to a companion terminal 60 fixed to a companion bar 46. Said terminal 60 is connected by a wire 51a to circuit control means hereinafter described. A tension spring 62 connected to bars 46 and 52 of each pair of stationary and movable contact members normally holds movable contact member 44 or 44a disengaged from its companion stationary contact member. The movable contact members 44 or 44a are caused to engage their companion stationary contact members by individual plungers 64 mounted for movement in guide members 66 fixed in insulation bars 46. Plungers 64 are operated by a stationary cam track 68 fixed to the frame F of the elevator car. To reduce friction, each plunger 64 is provided with a wheel 70 which engages the cam track. It will be understood that spring 62 resiliently holds the upper ends or wheels 70 of plunger 64 in engagement with cam track 68. It will be observed that each solenoid is connected to two pairs of stationary and movable contacts which are normally open and which are closed under the control of cam track 68, one pair, when closed, causing the frame 13 to move in one direction longitudinally of plunger 24, for opening the doors of the elevator car and the other pair of contacts causing the solenoids to move frame 13 in the opposite direction longitudinally of plunger 24 to close said doors.

Figure 9:
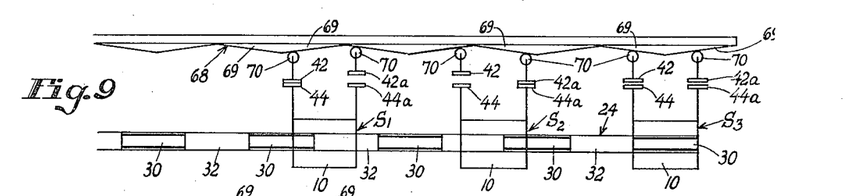
Figs. 9, 10 and 11 are diagrammatic views illustrating the operation of the motive device of the present invention.
Figure 10:
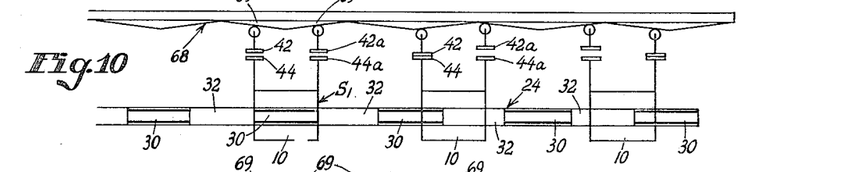
Figure 11:
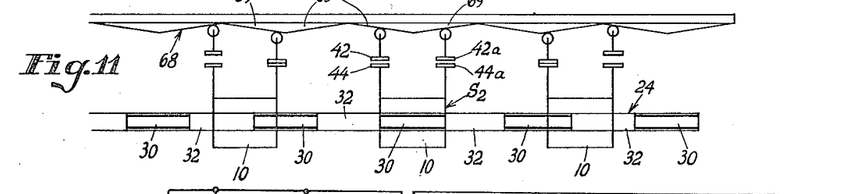

The actuation of the companion contacts for each of the solenoids S1, S2 and S3 is illustrated in Figs. 9 to 11, and in reference thereto it will be understood that the cam track 68 is designed so that the low parts of the cams indicated at 69 are lined up with the ends of the magnetic sections 30 of plunger 24 so that when a magnetic section 30 of the plunger is centered within the winding 10 of the solenoid the contacts 42 and 44 of that solenoid are open. This is illustrated in Fig. 9 which illustrates magnetic section 30 centered within the winding 10 of solenoid S3, the contacts 42, 42a and 44, 44a of that solenoid being open. Similarly in Fig. 10 the contacts 42, 42a and 44, 44a of the winding of solenoid S1 are open as are the contacts of the winding of the solenoid S2, as illustrated in Fig. 11. On the other hand, when a magnetic section of the plunger is entering the winding of one of the solenoids, the lobe of the cam depresses the proper contact roller 70 for closing the proper companion contacts for energizing the winding of that solenoid. As plunger 24 is stationary the coils of the solenoids are pulled over said plunger carrying the door D1 with it and moving the rollers 70 under the cam and thereby closing and opening the several contacts at the proper time, whereby to obtain smooth and continuous thrusting movements.

The operation of the corridor door D3 under the control of the electro-magnetic motive device of the present invention will now be described. This is accomplished by an electromagnetically controlled clutch which releasably connects the corridor door D3 to the car door D1 so that when the latter is operated, the corridor door is also operated. The releasable clutch comprises a lever 72 pivotally mounted on the elevator car door D1 as at 74 in a bracket 76 secured to said door. The lower end of said lever is provided with a clutch member 78 adapted to engage a clutch member 80 carried by the corridor door D3. Clutch member 80 is channel shaped and is adapted to receive clutch member 78 therein when the lever 72 is actuated as will hereinafter be described. When clutch member 78 is projected into clutch member 80, said clutch member 78 is in position to engage either of the opposite side walls 82 of clutch member 80 for moving the corridor door D3 either in opening or in closing direction. Clutch member 80 is pivotally mounted at its upper end to the corridor door by a pivot pin 84. The lower part of clutch member 80 is provided with a slot 86 in which a pin 88 carried by the door D3 is engaged for limiting the pivotal movement of clutch member 80 in both directions. One of the side walls 82 of clutch member 80 is provided with a roller 90 which is engaged by the bar lock cam 92 which is constituted by one arm of the bar lock lever 94 pivoted to the door D3 by a pivot pin 96. Bar lock lever 94 is pivotally connected at its outer end thereof to one end of a link 98 by a pivot pin 100. The other end of link 98 forming part of the bar lock is pivotally connected by a pivot pin 102 to a bracket 104 fastened to the wall 106 of the elevator shaft. Clutch lever 72 is guided for movement toward and from clutch member 80 by guide plates 108 fastened to door D1. Said clutch lever 72 is normally held in retracted position as illustrated in Fig. 6 by a spring 110.

The electro-magnetic means for actuating clutch lever 72 to project clutch member 78 into engagement with clutch member 80 comprises a solenoid 112 mounted in a casing or frame 114 carried by and movable with bracket 38. For this frame 114 has a bracket 115 which is secured to bracket 38. Solenoid 112 is provided with an iron plunger 116 which is pivotally connected by a link 118 of insulation material to the upper end 120 of clutch lever 72. The iron plunger 116 is provided with an extension 122 constituted by a square rod of brass or other non-magnetic material and guided for movement in openings 124 and 126 in insulation plates 128 and 130 of frame 114. Rod 122 is provided with movable contact members 132 and 134 which are movable with said rod and are adapted to engage, respectively, a pair of stationary terminals 136 carried by end plate 130 and a pair of stationary terminals 138 carried by plate 128 of the solenoid frame 114. Contact members 136 are connected to terminals 140 on the top wall 142 of the solenoid frame, and contact members 138 are connected to terminals 144 on said wall 142. The terminals for the winding of solenoid 112 are indicated at 146. Contact members 132 and 134 are movable longitudinally of rod 122 as well as with the latter. Movement of contact member 132 in one direction in relation to rod 122 is prevented by a cotter pin 148 while movement of said contact member in the opposite direction is opposed by a spring 150 which bears at one end thereof on said contact member and on the other end against an abutment member 152 mounted on rod 122 and held against movement in one direction by a cotter pin 154. Movement of contact member 134 in one direction (to the left, viewing Fig. 7) is limited by a cotter pin 135 resiliently opposed by a spring 156 which, at one end thereof, bears against said contact member 134 and at its other end against an abutment 158 which is prevented from moving in a direction away from contact member 134 by cotter pin 154.

When solenoid 112 is energized, plunger 116 is drawn in thereby disengaging movable contact member 134 from companion stationary contact members 138 and engaging movable contact member 132 with companion stationary contact members 136. The movement of plunger 116 into the winding of solenoid 112 actuates clutch lever 72 whereby clutch member 78 is engaged with clutch member 80. The windings of solenoids S1, S2 and S3 of the electro-magnetic motive device are energized in sequence when contact members 136 are engaged by contact member 132 whereby door D1 is operated. The initial movement of door D1 causes clutch member 80 to swing about its pivot 84 and thereby causing cam roller 90 carried by clutch member 80 to push the bar lock cam 92 in a direction to break the toggle constituted by bar lock lever 94 and link 98 after which the continued movement of door D1 in the same direction is effective to move the corridor door D3 in the same direction therewith. It will be observed that rod 122 has a limited movement to the left (viewing Fig. 7) before contact member 132 closes contact members 136 so that clutch members 78 and 80 are engaged just before the solenoids S1, S2 or S3 of the electro-magnetic motive device are energized, thus assuring that door D3 will be operated together with door D1.

Figure 12:
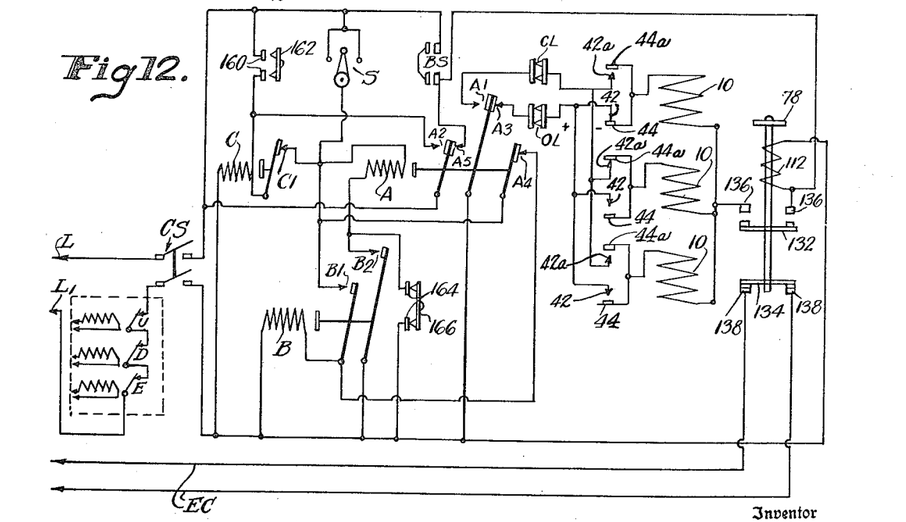
Fig. 12 is a more or less diagrammatic view of the motive device and of the circuit and controls therefor.

By reference to the wiring diagram shown in Fig. 12, the operation of the system will be more fully understood. In this diagram the main control switch of the circuit is indicated at CS. The electric energy for operating the motive device for opening and closing the doors is derived from the line L—L1 in which the relay controlled contacts U, D and E are in circuit in the usual way. The contacts U, D and E are controlled by the "up," "down" and "brake" relays, respectively, as in the conventional elevator control system. When the elevator car is in motion contacts U, D and E are open so that no power is supplied through switch CS to the circuit in which solenoid windings 10 are located, the circuit to the door operator being thus interrupted so the doors can not be opened when the elevator car is in motion. The elevator control circuit is indicated at EC and is seen to include the contacts 138 which are opened and closed by contact member 134 under the control of solenoid 112. When contacts 138 are open, which is the condition when the elevator car is at floor level and the doors are to be opened circuit EC is interrupted so that no power can be supplied for moving the elevator car up or down. The relays A, B and C are for convenience indicated at the windings and the contacts controlled by their respective relays are designated by the letters A, B and C together with indicating numerals. Relay A is the closing and opening relay and is provided with normally open contacts A1 and A2, and normally closed contacts A3, A4 and A5. When contacts A1 of relay A are closed, the windings 10 are energized for movement thereof in door closing direction. When contacts A3 of relay A are closed, the solenoid windings 10 are energized for movement in door opening direction. Relay B is a closing check relay whereby movement of the door to closing position is interrupted momentarily to prevent the door from slamming, and relay C is an opening check relay. Each of relays B and C has a time-lag characteristic. Contacts B1 and B2 of relay B are normally open, while contacts C1 of relay C are normally closed. Contacts 160 are normally open and are closed by the corridor door, in a manner well understood in the art, when said door is a predetermined distance, say about one foot from fully open position. Contacts OL are normally closed and are opened when the corridor door is in fully open position. Contacts 164, 166 are normally closed and are controlled by the car door D1 in a manner well known in the art whereby said contacts are opened when said door is within a predetermined distance, say one foot, from fully closed position. Closing limit contacts CL are normally closed and are opened when the car door D1 is in fully closed position.

The control switch S located in the elevator car is closed while the car is in motion.

Assuming now that the elevator is moving down in the elevator shaft and is about to make a stop at a floor, the operator slows his car down when approaching the particular floor and centers his car switch S upon entering the levelling zone. Until this time, the main feed to the control switch S from the line L—L1 is open at D and at the brake interlock E. When the car levels to a stop, D closes and the brake sets closing the main line and energizing the clutch solenoid coil 112 through normally closed contacts A5 of the door operating relay, the winding of which is indicated at A. As clutch member 78 engages clutch member 80 on the corridor door, contacts 138 open the circuit EC of the elevator main control lines. Contact members 136 are closed by contact member 132 under the control of solenoid 112 thereby energizing the windings 10 of solenoids S1, S2 and S3, under the control of cam track 68 through the timing contacts 42, 44 for the open direction and placing the opening limit contacts OL and the normally closed contacts A3 of relay A in the circuit. When the corridor door D3 reaches a point within about 12 inches of the opening limit, the opening check contacts 160 are closed by the contact member 162 carried or controlled by the corridor door, closing the circuit through relay winding A through normally closed contacts C1 of opening check relay C, the winding of which is indicated at C, and closing the circuit through closing check contacts 164 which are normally closed by a contact member 166 carried or controlled by the elevator or corridor door. This results in the opening of normally closed contacts A3 and simultaneously in the closing of normally open contacts A1 whereby current passes through the closing contacts 42a, 44a tending to reverse the movement of the doors, but before the doors can start to close, opening check relay C closes through opening check contacts, opening the normally closed contacts of relay C which in turn results in the deenergization of relay A whereby contacts A1 are opened and contacts A3 are closed, thus again completing the opening circuit so that the doors move the remaining distance to their final open position. Opening check relay C is of the time-lag type, so that instantaneously acting relay A is energized before relay C can act to open the circuit through relay A. This results in checking the speed of the doors in the opening direction thereby to prevent the doors from slamming. When the doors have opened to their full extent the opening limit contacts OL are disengaged thus breaking the circuit through the solenoids S1, S2 and S3, without however, disengaging the clutch from the corridor door.

When the operator wishes to close the doors and to continue, let us say in the down direction, he moves his car switch S to the down position. Relay A is immediately energized through the car switch S and closing check contacts 164, 166 thereby closing contacts A1 and opening contacts A3 whereby to complete the circuit through the closing limits CL and timing contacts 42a, 44a of the solenoid windings 10 for the closing direction. When the doors move to about 12 inches of their fully closed position the closing check contacts 164, 166 open, thereby deenergizing relay A and opening contacts A1 and closing contacts A3 which results in a tendency to reverse and reopen the doors, just as the speed of the doors is checked timelag relay B is energized through the car switch S and normally closed contacts A4, closing normally open contacts B2 of relay B, which locks itself in closed circuit through normally open contacts B1. Thereupon relay A is again energized through contacts B2 of relay B, thus closing contacts A1 and opening contacts A3, and the doors continue to close and move to their final closed position. When the bar lock has secured the corridor door, the switch BS on the bar lock opens. As contacts A5 are already open the feed of current to the clutch solenoid 112 and to the operating solenoids S1, S2 and S3 is interrupted and the clutch member 78 is disengaged from the clutch member 80 by spring 110, thus closing contacts 134 and 138 and the elevator control circuit EC. The circuit of solenoids S1, S2 and S3 is now again open and under the control of contacts U, D and E of the elevator operating relays whereby the door operator cannot be actuated while the elevator car is in motion.

While I have shown and described the preferred embodiment of my invention, it will be understood that the latter may be embodied otherwise than as here shown and that in the illustrated embodiment, certain changes in the details of construction and in the arrangement of parts may be made. Accordingly, I do not wish to be limited to the invention as herein shown or described except as may be required by the scope of the appended claims.

Having thus described my invention, what I claim and desire to secure by Letters Patent is:

1. Electro-magnetic motive means comprising a solenoid plunger having longitudinally extending magnetic and non-magnetic sections of equal length disposed successively along the length of the plunger in end to end relation, a plurality of solenoid windings disposed in spaced relation longitudinally of said plunger, the length of each of said windings being equal to the length of one of said sections of the plunger, and the distance between adjacent solenoid windings being about one and two-thirds the length of a solenoid winding, said solenoid windings and said plunger being monuted for relative movement in the longitudinal direction of the plunger and relatively movable in said direction when said windings are energized, and means operable in response to said relative movement of said solenoid windings and plunger for successively energizing said solenoid windings in one sequence for effecting said relative movement in one direction and for successively energizing said solenoid windings successively in a reversed sequence for effecting said relative movement in a reverse direction.

2. Electro-magnetic motive means comprising a solenoid plunger having longitudinally extending magnetic and non-magnetic sections of equal length disposed successively along the length of the plunger in end to end relation, a plurality of solenoid windings disposed in spaced relation longitudinally of said plunger, the length of each of said windings being equal to the length of one of said sections of the plunger, and the distance between adjacent solenoid windings being about one and two-thirds the length of a solenoid winding, said solenoid windings and said plunger being mounted for relative movement in the longitudinal direction of the plunger and relatively movable in said direction when said windings are energized, and means operable in response to said relative movement of said solenoid windings and plunger for successively energizing said solenoid windings in one sequence for effecting said relative movement in one direction and for successively energizing said solenoid windings successively in a reversed sequence for effecting said relative movement in a reverse direction and for de-energizing the windings when the magnetic sections of the plunger are centered in said windings.

3. Electro-magnetic motive means comprising a solenoid plunger having longitudinally extending magnetic and non-magnetic sections disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, stationary cam means, switching means mounted for movement in relation to said cam means, said switching means comprising relatively movable companion contact members engageable with and disengageable from each other for controlling the energization and de-energization of said solenoid windings, and means movable with said switching means and engageable with said stationary cam means for engaging and disengaging said companion contact members.

4. Electro-magnetic motive means comprising a solenoid plunger having longitudinally extending magnetic and non-magnetic sections of equal length disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, the axial length of each of said solenoid windings being equal to the length of one of said sections of the plunger, the distance between adjacent solenoid windings being about one and two-thirds the axial length of a solenoid winding, and means for energizing said solenoid windings one at a time in succession.

5. Electro-magnetic motive means comprising a solenoid plunger having longitudinally extending magnetic and non-magnetic sections disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, a stationary cam track extending longitudinally of said solenoid plunger, switching means mounted for movement longitudinally of said cam track, said switching means comprising relatively movable companion contact members engageable with and disengageable from each other for controlling the energization and de-energization of said solenoid windings, and means movable with said switching means and engageable with said stationary cam track for engaging and disengaging said companion contact members.

6. Electro-magnetic motive means comprising a solenoid plunger having longitudinally extending magnetic and non-magnetic sections disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, pairs of relatively movable contact members associated with said solenoid windings and engageable with each other upon relative movement of said solenoids and plunger, other pairs of relatively movable contact members associated with said solenoid windings and engageable with each other upon relative movement of said solenoids and plunger, means for successively engaging said contact members of each pair with each other whereby to successively energize said solenoid windings, the two pairs of contact members associated with each solenoid being in parallel circuit relation with each other and in series with said solenoid, and means operable automatically in response to a predetermined relative movement of said windings and said plunger for open-circuiting the contact members of said other pairs of contact members when the relative movement of said windings and solenoid plunger is in one direction and for open-circuiting the contact members of said first mentioned pairs of contact members when the relative movement of said windings and solenoid plunger is in the opposite direction.

7. Electro-magnetic motive means comprising a solenoid plunger having longitudinally extending magnetic and non-magnetic sections of equal length disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, the axial length of each of said solenoid windings being equal to the length of one of said sections of said plunger, the distance between adjacent solenoid windings being about one and two-thirds the axial length of a solenoid winding, pairs of relatively movable contact members associated with said solenoid windings and engageable with each other upon relative movement of said solenoids and plunger, other pairs of relatively movable contact members associated with said solenoid windings and engageable with each other upon relative movement of said solenoids and plunger, and means for energizing said solenoid windings in succession including means for successively engaging said contact members of each pair with each other.

8. Electro-magnetic motive means comprising a solenoid plunger having longitudinally extending magnetic and non-magnetic sections of equal length disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, the axial length of each of said solenoid windings being equal to the length of one of said sections of the plunger, the distance between adjacent solenoid windings being about one and two-thirds the axial length of a solenoid winding, pairs of relatively movable contact members associated with said solenoid windings and engageable with each other upon relative movement of said solenoids and plunger, other pairs of relatively movable contact members associated with said solenoid windings and engageable with each other upon relative movement of said solenoids and plunger, means for successively engaging said contact members of each pair with each other whereby to energize said solenoid windings in succession, the two pairs of contact members associated with each solenoid being in parallel circuit relation with each other and in series with said solenoid, and means for open-circuiting the contact members of said other pairs of contact members when the relative movement of said windings and solenoid plunger is in one direction and for open-circuiting the contact members of said first mentioned pairs of contact members when the relative movement of said windings and solenoid plunger is in the opposite direction.

9. Electro-magnetic motive means comprising a solenoid plunger having longitudinally extending magnetic and non-magnetic sections disposed successively along the length of the plunger in end to end relation, a plurality of solenoid windings disposed longitudinally of said plunger, said solenoid windings and said plunger being mounted for relative movement in the longitudinal direction of the plunger and relatively movable in said direction when said windings are energized, a cam track extending longitudinally of said solenoid plunger, switching means mounted for movement in relation to said cam track, said switching means comprising a plurality of pairs of relatively movable companion contact members engageable with and disengageable from each other for controlling the energization and de-energization of said windings, respectively, there being two pairs of said contact members for each winding, said two pairs of contact members being in parallel relation with each other and in series with the companion solenoid, and means movable with said switching means and engageable by said cam track for controlling the actuation of said pairs of contact members.

10. Electro-magnetic motive means comprising a solenoid plunger having longitudinally extending magnetic and non-magnetic sections of equal length disposed successively along the length of the plunger in end to end relation, three solenoid windings disposed in spaced relation longitudinally of said plunger, said solenoid windings and said plunger being mounted for relative movement in the longitudinal direction of the plunger and relatively movable in said direction when said windings are energized, the axial length of each of said solenoid windings being equal to the length of one of said sections of the plunger, the distance between adjacent solenoid windings being about one and two-thirds the axial length of a solenoid winding, and means for energizing said solenoid windings in succession one at a time.

11. Electro-magnetic motive means comprising a solenoid plunger having longitudinally extending magnetic and non-magnetic sections of equal length disposed successively along the length of the plunger in end to end relation, three solenoid windings disposed in spaced relation longitudinally of said plunger, said solenoid windings and said plunger being mounted for relative movement in the longitudinal direction of the plunger and relatively movable in said direction when said windings are energized, the axial length of each of said solenoid windings being equal to the length of one of said sections of the plunger, the distance between adjacent solenoid windings being about one and two-thirds the axial length of a solenoid winding, and means for energizing said solenoid windings in succession one at a time, the space between adjacent magnetic sections of said plunger being such that only one of a group of three of said magnetic sections is centered at any one time within any one of said three solenoid windings.

12. Electro-magnetic motive means comprising a stationary plunger having longitudinally extending magnetic and non-magnetic sections disposed successively along the length of the plunger in end to end relation, a frame mounted for movement longitudinally of said plunger, three solenoid windings carried by said frame, said plunger extending through said solenoid windings axially thereof, the axial lengths of said solenoid windings being equal, the distance between adjacent solenoid windings being about one and two-thirds the axial length of a solenoid winding, the space between adjacent magnetic sections of said plunger being such that only one of a group of three of said magnetic sections is centered at any one time within any one of said three solenoid windings, and means operable in response to said movement of the solenoid windings for energizing said solenoid windings in succession to cause movement of said frame longitudinally of said plunger.

13. Electro-magnetic motive means comprising a stationary plunger having longitudinally extending magnetic and non-magnetic sections disposed successively along the length of the plunger in end to end relation, a frame mounted for movement longitudinally of said plunger, three solenoid windings carried by said frame, said plunger extending through said solenoid windings axially thereof, the axial lengths of said solenoid windings being equal, the distance between adjacent solenoid windings being about one and two-thirds the axial length of a solenoid winding, the space between adjacent magnetic sections of said plunger being such that only one of a group of three of said magnetic sections is centered at any one time within any one of said three solenoid windings, means for energizing said solenoid windings in succession one at a time to cause movement of said frame longitudinally of said plunger, and means for interrupting the circuit through all of said solenoid windings when said frame is in a predetermined position longitudinally of said plunger.

14. Electro-magnetic motive means comprising a stationary plunger having longitudinally extending magnetic and non-magnetic sections disposed successively along the length of the plunger in end to end relation, a frame mounted for movement longitudinally of said plunger, three solenoid windings carried by said frame, said plunger extending through said solenoid windings axially thereof, the axial lengths of said solenoid windings being equal, the distance between adjacent solenoid windings being about one and two-thirds the axial length of a solenoid winding, the space between adjacent magnetic sections of said plunger being such that only one of a group of three of said magnetic sections is centered at any one time within any one of said three solenoid windings, means for successively energizing said solenoid windings to cause movement of said frame longitudinally of said plunger, means for de-energizing each of said windings when a magnetic section of the plunger is substantially centered therein, and means for interrupting the circuit through all of said solenoid windings when said frame is in a predetermined position longitudinally of said plunger.

15. Electro-magnetic motive means comprising a solenoid plunger having longitudinally extending magnetic and non-magnetic sections disposed successively along the length of the plunger in end to end relation, a plurality of solenoid windings disposed in spaced relation longitudinally of said plunger, said solenoid windings and said plunger being mounted for relative movement in the longitudinal direction of the plunger and relatively movable in said direction when said windings are energized, means for successively energizing said solenoid windings, and means operable automatically in response to a predetermined relative movement of said plunger and windings in one direction to momentarily check said movement in the same direction.

FREDERICK C. FISHER.